United States Patent
Freund

(10) Patent No.: US 10,710,205 B2
(45) Date of Patent: Jul. 14, 2020

(54) QUERY UNIT FOR TOGGLE LEVER CLAMP

(71) Applicant: Pepperl+Fuchs GmbH, Mannheim (DE)

(72) Inventor: Thomas Freund, Mannheim (DE)

(73) Assignee: Pepperl+Fuchs GmbH, Mannheim (DE)

( * ) Notice: Subject to any disclaimer, the term of this patent is extended or adjusted under 35 U.S.C. 154(b) by 463 days.

(21) Appl. No.: 14/812,065

(22) Filed: Jul. 29, 2015

(65) Prior Publication Data

US 2016/0031057 A1 Feb. 4, 2016

(30) Foreign Application Priority Data

Aug. 1, 2014 (DE) ............. 20 2014 103 575 U

(51) Int. Cl.
| | | |
|---|---|---|
| *B23Q 17/00* | (2006.01) | |
| *B25B 5/12* | (2006.01) | |
| *B25B 5/16* | (2006.01) | |
| *G01D 5/20* | (2006.01) | |

(52) U.S. Cl.
CPC ............ *B23Q 17/003* (2013.01); *B25B 5/12* (2013.01); *B25B 5/122* (2013.01); *B25B 5/16* (2013.01); *G01D 5/20* (2013.01)

(58) Field of Classification Search
CPC .. B25B 5/06; B25B 5/122; B25B 5/16; B25B 5/12; B23Q 17/003
USPC ..................................................... 269/32, 49
See application file for complete search history.

(56) References Cited

U.S. PATENT DOCUMENTS

| | | | | |
|---|---|---|---|---|
| 5,694,042 A | * | 12/1997 | Eaton ...................... | G01D 5/347 324/207.22 |
| 5,845,897 A | * | 12/1998 | Tunkers .................. | B25B 5/122 269/32 |
| 5,996,984 A | * | 12/1999 | Takahashi ................ | B25B 5/16 269/228 |
| 6,189,877 B1 | * | 2/2001 | Boris ...................... | B25B 5/122 269/228 |
| 6,585,246 B2 | * | 7/2003 | McCormick ............. | B25B 5/16 269/228 |
| 6,913,254 B2 | * | 7/2005 | Pavlik ...................... | B23Q 3/18 269/32 |

(Continued)

FOREIGN PATENT DOCUMENTS

| | | |
|---|---|---|
| CN | 201478952 U | 5/2010 |
| CN | 102099587 A | 6/2011 |

(Continued)

*Primary Examiner* — Orlando E Aviles
*Assistant Examiner* — Seahee Yoon
(74) *Attorney, Agent, or Firm* — Collard & Roe, P.C.

(57) ABSTRACT

Query unit for determining the status of moving or movable parts of a system part, particularly for determining the end positions of a clamping arm of a toggle lever clamping apparatus, has a sensor unit and an electroblock. The sensor unit has at least one sensor and a connector plug-in connection part for connecting the sensor unit with the electroblock and can be attached to the system part. The electroblock has at least one electrical connector element for connecting an outer, releasable connection cable, a connector plug-in connection part for connecting the electroblock with the sensor unit, and at least one screw passage opening for installation on an outer surface of the system part. The connector plug-in connection part of the sensor unit is connected in an opening of the system part, with shape fit.

5 Claims, 2 Drawing Sheets

(56) References Cited

U.S. PATENT DOCUMENTS

| | | | |
|---|---|---|---|
| 8,132,800 B2* | 3/2012 | Tamai | B25B 5/122 |
| | | | 269/228 |
| 9,827,642 B2* | 11/2017 | Higurashi | G01B 7/003 |
| 2001/0038175 A1* | 11/2001 | Nagai | B25B 5/122 |
| | | | 269/237 |
| 2002/0063371 A1* | 5/2002 | Takahashi | B25B 5/16 |
| | | | 269/32 |
| 2003/0080283 A1* | 5/2003 | Migliori | B25B 5/122 |
| | | | 250/221 |
| 2004/0061268 A1* | 4/2004 | Sawdon | B25B 5/064 |
| | | | 269/32 |
| 2004/0070282 A1* | 4/2004 | Kirchdoerffer | H03K 17/9502 |
| | | | 307/126 |
| 2004/0195751 A1* | 10/2004 | Migliori | B25B 5/12 |
| | | | 269/244 |
| 2006/0021979 A1* | 2/2006 | Migliori | B25B 5/087 |
| | | | 219/158 |
| 2011/0162522 A1 | 7/2011 | Tuenkers | |
| 2011/0277280 A1 | 11/2011 | Blaauw et al. | |
| 2014/0035212 A1 | 2/2014 | Dellach | |
| 2017/0182635 A1* | 6/2017 | Freund | B25B 5/122 |

FOREIGN PATENT DOCUMENTS

| | | |
|---|---|---|
| CN | 102753309 A | 10/2012 |
| CN | 103567913 A | 2/2014 |
| DE | 296 14 630 U1 | 1/1998 |
| DE | 203 15 012 U1 | 1/2005 |
| EP | 0695603 A1 | 2/1996 |
| EP | 0 938 952 A2 | 9/1999 |
| EP | 1426143 B1 | 4/2009 |

* cited by examiner

QUERY UNIT FOR TOGGLE LEVER CLAMP

CROSS REFERENCE TO RELATED APPLICATIONS

Applicant claims priority under 35 U.S.C. § 119 of German Application No. 20 2014 103 575.3 filed Aug. 1, 2014, the disclosure of which is incorporated by reference.

BACKGROUND OF THE INVENTION

1. Field of the Invention

The invention relates to a query unit for determining the status of moving or movable parts of a system part, particularly for determining the end positions of a clamping arm of a toggle lever clamping apparatus, having a sensor unit and an electroblock. The sensor unit has at least one sensor and a connector plug-in connection part for connecting the sensor unit with the electroblock and can be attached to the system part. The electroblock has at least one electrical connector element for connecting an outer, releasable connection cable, a connector plug-in connection part for connecting the electroblock with the sensor unit, and at least one screw passage opening for installation on an outer surface of the system part.

Furthermore, the invention relates to a toggle lever clamping apparatus having such a query unit.

2. Description of the Related Art

Toggle lever clamping apparatuses are used in car body construction to hold components in sheet-metal form, for example in order to then permanently connect these by means of spot welding, gluing, clinching or the like. High holding and pressing forces achieved using the toggle lever joint allow secure fixation. In general, such toggle lever clamping apparatuses consist of a clamping head and a piston/cylinder unit that follows this head axially, the unit consisting of a cylinder and a piston to which the pressure of a pressure medium, particularly compressed air, is alternately applied on both sides. The piston is provided with a piston rod that passes through the clamping head, in part, and carries the toggle lever joint arrangement at the end, by way of a joint. The toggle lever joint arrangement is connected with a clamping arm that interacts with a jaw or the like, in such a manner that the components to be held can be clamped in place between the jaw and the clamping arm. In general, such toggle lever clamping apparatuses are incorporated into a sequencing control, so that the production lines can be automated, to a great extent.

Such a clamping apparatus is known, for example, from EP 0 938 952 A2. The clamping apparatus described therein has a head piece having a clamping arm mounted on it so as to pivot, which arm is connected with a drive element by way of a setting mechanism disposed in the head piece. The setting mechanism has a positioner that is adjustable along a setting path. A coil to which current can be applied is disposed along the setting path for querying the position, so that the positioner is situated in the gradient-oriented region of effect of the magnetic field of the coil in all positions of the setting mechanism. In this way, every position of the clamping arm can be queried at all times.

If the query is directed only at end positions, clearly the structure can be simplified. For example, a sensor unit for a clamping apparatus is known from DE 296 14 630 U1, which unit determines only the movement end positions. For this purpose, the sensor unit has two sensors that can be attached in the housing of the clamping apparatus, which sensors are connected with a connector and display housing having a connector plug-in connection part, by means of connection cables. The connector and display housing has two intersecting screw passage openings and can be attached to the clamping apparatus in one of two different installation positions, by means of an attachment screw that passes through one of these screw passage openings. Furthermore, the clamping apparatus has an installation plate having two thresholds, which form an insertion shaft for the connector and display housing.

It is furthermore known from DE 203 15 012 U1, that a connection between a connector and display housing, which is referred to as an electroblock, and electrical sensor satellites can be configured not only in wired manner but also in wireless manner.

SUMMARY OF THE INVENTION

It is the task of the present invention to improve such an end position query unit, particularly with regard to its installation and stability.

This task is accomplished by means of releasably connecting the sensors to the further query unit by means of suitable connection means.

The query unit according to the invention, for determining the status of moving or movable parts of a system part, particularly for determining the end positions of a clamping arm of a toggle lever clamping apparatus, has a sensor unit and an electroblock. The sensor unit comprises at least one sensor and a connector plug-in connection part for connecting the sensor unit with the electroblock. Furthermore, the sensor unit can be attached to the system part. The electroblock comprises at least one electrical connector element for connecting an outer, releasable connection cable, a connector plug-in connection part for connecting the electroblock with the sensor unit, and at least one screw passage opening for installation on an outer surface of the system part. The connector plug-in connection part of the electroblock can be fixed in place in an opening of the system part, with shape fit.

The two-part embodiment of the query unit makes it possible to integrate low-maintenance parts of a query unit into the system part, while parts that must be serviced regularly or are more susceptible to failure are installed on the outside of the system part, in simple manner, so that they are easily accessible and can be replaced.

In this way, the sensors, which are very low-maintenance, on the one hand, and very sensitive to mechanical stress or contamination, on the other hand, can be firmly installed within the system part. In other words, the sensors can be firmly installed within the toggle lever clamping apparatus, for example. The connector plug-in connection part provided for a connection with the electroblock is then integrated into an outer wall of the system wall with shape fit. In this way, the connector plug-in connection part of the sensor device is accessible from the outside, and the interior of the system part can nevertheless be sealed relative to the surroundings, for example against dust.

Furthermore, the geometry or configuration of the electroblock can be adapted to the geometry of the system part, for example of a toggle lever clamping apparatus, independent of the sensors of the sensor unit, so that a stable structure that is as compact as possible, in total, is achieved, for example.

The electroblock particularly has an electrical connector element for connecting an outer releasable connection cable, for example for connecting to a production computer. This electrical connector element can be a plug-in and/or screwin connection with electrical contacts, for example. The electrical connector element of the electroblock can be affixed to the electroblock by means of an articulation, for example. In this way, the electrical connector element can be disposed in at least two positions or with at least two orientations.

Furthermore, the electroblock can have display means, for example light-emitting diodes, by means of which movement positions or statuses can be displayed.

The electroblock is installed on an outer surface of the system part by means of an attachment screw that passes through the at least one screw passage opening, for example, wherein the installation position is selected in such a manner that the connector plug-in connection part of the electroblock is connected with the connector plug-in connection part of the sensor unit.

The electroblock may advantageously have a connection means for a shape-fit connection with the system part. In order to install the electroblock on the system part, the block must be set onto an outer surface of the system part and attached by means of an attachment screw that passes through the screw passage opening and engages into an inside thread on the system part, for example. The electroblock is held in the desired position by means of the connection means, after it has been set onto the system part, so that it is no longer to hold the electroblock in place by hand for installation or attachment, for example. In this way, installation of the electroblock is clearly simplified.

It is advantageous if the connection means is a projection or a recess. By means of providing a corresponding counter-piece on the system part, a plug-in connection can be implemented in simple manner. This implementation thereby represents a simple possibility for achieving shape fit between the connection means of the electroblock and the counter-piece of the system part.

It is advantageous if the connection means is a pin or a spring contact pin. A pin having a cylindrical, oval or also polygonal circumference, for example, represents a particularly simple possibility for producing a shape-fit connection between the electroblock or its connection means and a system part, which has a correspondingly shaped recess for this purpose. Setting the electroblock in or on can be simplified by the use of a spring contact pin, and/or better fixation of the electroblock for installation can be ensured.

It is advantageous if the at least one sensor is an inductive sensor. Typically, inductive switches are used, particularly for toggle lever clamping apparatuses used in car body construction, for easy and reliable determination of end positions.

It is advantageous if the connection means of the electroblock is disposed on a side wall of the electroblock, which runs parallel to a connecting direction of the connector plug-in connection part of the electroblock. In this way, it can be ensured, in simple manner, that the electroblock is connected with the sensor unit when it is set onto the system part, by means of the connector plug-in connection part, and connected with the system part by means of the connection element.

Furthermore, the invention relates to a toggle lever clamping apparatus that has a query unit of the type described above, as well as an opening for shape-fit accommodation of the connector plug-in connection part of the sensor unit. The shape-fit integration of the connector plug-in connection part of the sensor unit into an opening of the clamping apparatus allows a compact construction of the toggle lever clamping apparatus, the basic body of which can be sealed in simple manner, and to the outer shape of which the electroblock can be adapted in simple manner.

The toggle lever clamping apparatus may advantageously have a means for shape-fit accommodation of the connection means of the electroblock. Simple installation of the electroblock is made possible by means of the shape-fit accommodation of the connection means in a corresponding means or counter-piece on the toggle lever clamping apparatus. This arrangement particularly simplifies maintenance work.

It is advantageous if the means is a recess or a projection, for example a pin or a spring contact pin, which present particularly simple variants for implementation of a shape-fit connection.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings.

DETAILED DESCRIPTION OF PREFERRED EMBODIMENTS

Figure 1:
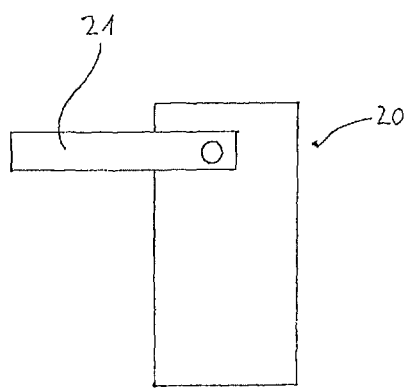
FIG. 1 shows a toggle lever clamping apparatus.

FIG. 1 shows a system part configured as a toggle lever clamping apparatus 20 having a clamping arm 21 mounted so as to pivot. Such toggle lever clamping apparatuses 20 are particularly used in car body construction, to hold components in sheet-metal form.

Figure 2:
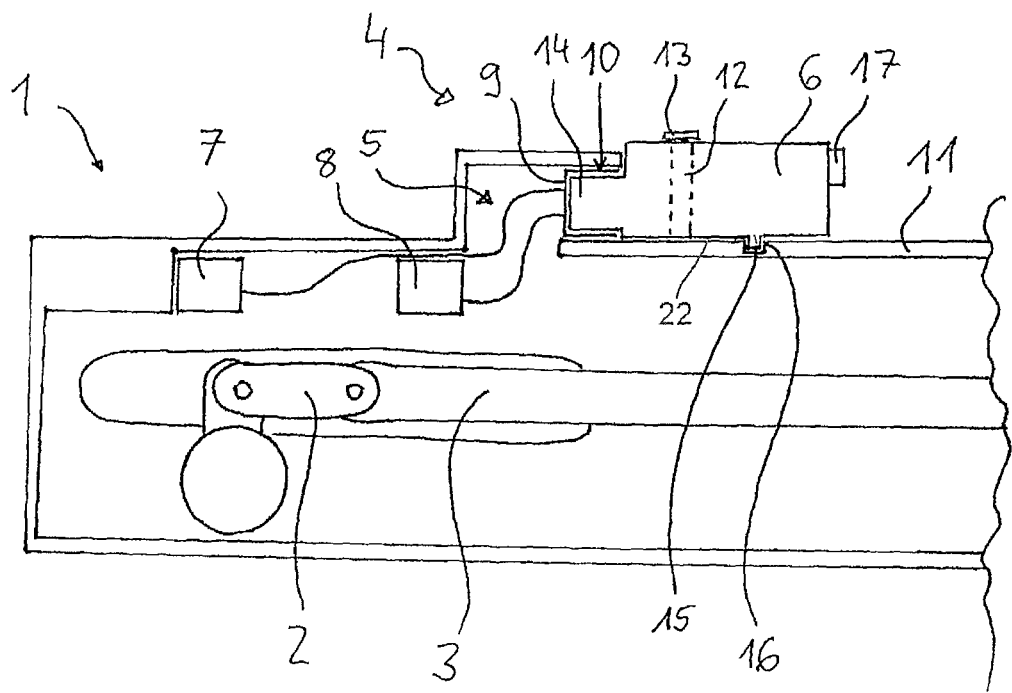
FIG. 2 shows a head of a toggle lever clamping apparatus having a query unit.

In FIG. 2, a head 1 of the toggle lever clamping apparatus 20, having a toggle lever joint arrangement 2, which is connected with one end of a piston rod 3, and a query unit 4 for determining the movement end position of the toggle lever clamping apparatus 20 are shown schematically. The query unit 4 consists of a sensor unit 5, which is integrated into the head 1 of the toggle lever clamping apparatus 20, and an electroblock 6, which is installed on the head 1 from the outside. The sensor unit 5 has two sensors 7, 8, which are attached at two fixed positions, assigned to the movement end positions, within the head 1. Furthermore, the sensor unit 5 comprises a connector plug-in connection part 9, which is attached, with shape fit, in an opening 10 of the head 1. The sensors 7, 8 are connected with the connector plug-in connection part 9 by means of two cables.

The connector plug-in connection is integrated into a housing wall 11 of the head 1 in such a manner that the toggle lever clamping apparatus 20 is sealed against outer influences, such as dust, for example. In this way, the sensors 7, 8, in particular, are also disposed in protected manner.

The electroblock 6 is installed on the housing wall 11 of the head 1 from the outside. For this purpose, the electroblock 6 has a screw passage opening 12 (FIG. 3A), through which an attachment screw 13 (FIG. 2) passes and engages into a corresponding thread (not shown) in the housing wall 11.

For connecting with the sensor unit 5, the electroblock 6 has a connector plug-in connection part 14, which is configured as a counter-piece to the connector plug-in connection part 9 of the sensor unit 5 and can be connected with this unit.

To facilitate installation of the electroblock 6, the block has a further connection means 15. This connection means 15 is configured as a short pin in the exemplary embodiment shown, which pin engages, with shape fit, into a means 16 for accommodating the connection means 15, configured as a corresponding recess in the housing wall 11 of the head 1. In this way, the electroblock 6 is already held when it is set on, and does not have to be additionally held in place or fixed in place for attaching it with the attachment screw 13. It is particularly advantageous if the connection means 15 is configured as a spring contact pin.

In order to allow the most compact construction possible and to protect the electroblock 6 somewhat, the connector plug-in connection part 9 of the sensor unit 5 or the opening 10 in the housing wall 11 provided for it can be disposed as shown in the example, in such a manner that the electroblock 6 borders on housing walls 11 of the toggle lever clamping apparatus 20 with at least two side walls.

If the electroblock 6 is configured as in the example shown, in such a manner that the connector plug-in connection part 14 of the electroblock 6 is disposed on a side wall 22 of the electroblock 6, which wall 22 runs perpendicular to a further, side wall of the electroblock 6, on which the connection means 15 is disposed, then first the connector plug-in connector parts 9, 14 and then also the connection means 15 can be connected with the corresponding means 16 of the toggle lever clamping apparatus 20 by means of bringing the electroblock 6 up at a slight slant, and thereby a connection of the electroblock 6 with the housing wall 11 of the head 1 of the toggle lever clamping apparatus 20 is achieved, held at least by the connection means.

The electroblock 6 furthermore has a connector element 17 for connecting an outer, releasable connection cable, in order to connect the electroblock 6 to a power supply and/or a control computer (both not shown), for example. To signal movements statuses, the electroblock 6 can also have display means 18 (FIG. 3A), for example LEDs in different colors.

Figures 3A, 3B:
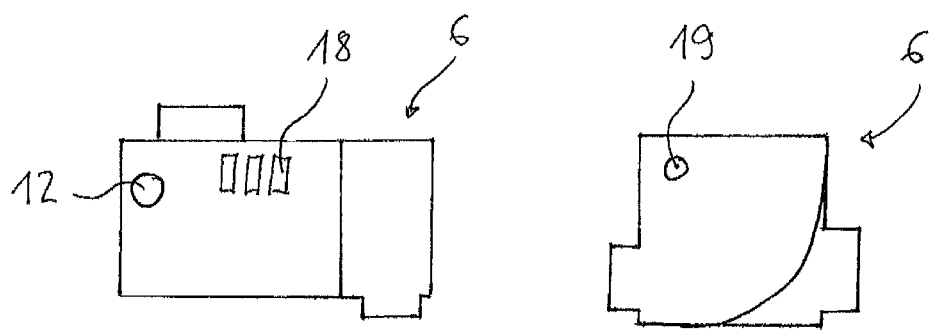
FIGS. 3A and 3B show an electroblock of the query unit from different directions.

As can be seen in FIG. 3B, the connector element 17 can be attached to the electroblock 6 by means of an articulation 19, for example, so that it can be positioned in at least two different orientations relative to the rest of the electroblock 6.

The number of sensors is based essentially on the type of sensors or on the movement statuses that are to be determined. If, for example, only one of two movement end positions is to be determined, then a single sensor is sufficient. Inductive sensors, for example, can be used as sensors.

Although only a few embodiments of the present invention have been shown and described, it is to be understood that many changes and modifications may be made thereunto without departing from the spirit and scope of the invention.

What is claimed is:

1. A query unit for determining a status of moving or movable parts of a toggle lever clamping apparatus comprising:
    (a) an electroblock; and
    (b) a sensor unit;
    wherein the electroblock has at least one electrical connector element for connecting an outer, releaseable connection cable, a first connector plug-in connection part which is a first projection for connecting the electroblock with the sensor unit, and at least one screw passage opening for installation on an outer surface of the toggle lever clamping apparatus, whereby the electroblock is installed on a housing wall of the toggle lever clamping apparatus from an outside;
    wherein the sensor unit has at least one sensor and a second connector plug-in connection part which has a second recess for connecting the sensor unit with the electroblock and attachable to the toggle lever clamping apparatus; and
    said first projection plugging into said second recess; and
    wherein the second connector plug-in connection part of the sensor unit is attachable in an opening of the toggle lever clamping apparatus with shape fit, wherein the connector plug-in connection is integrated into the housing wall of a head in such a manner that the toggle lever clamping apparatus is sealed against outer influences and that the sensors are disposed in a protected manner; and
    wherein the electroblock has a connector for shape-fit connection with the toggle lever clamping apparatus;
    wherein the connector is a shape-fit projection placed into a shape-fit recess of the housing wall.

2. The query unit according to claim 1, wherein the projection is a pin or a spring contact pin.

3. The query unit according to claim 1, wherein the at least one sensor is an inductive sensor.

4. The query unit according to claim 1, wherein the electroblock has a side wall running parallel to a connecting direction of the first connector plug-in connection part and wherein the connector of the electroblock is disposed on the side wall of the electroblock.

5. A toggle lever clamping apparatus comprising:
    (a) a query unit for determining a status of moving or movable parts of the toggle lever clamping apparatus; and
    (b) an opening;
    wherein the query unit comprises an electroblock and a sensor unit;
    wherein the electroblock comprises at least one electrical connector element for connecting an outer, releaseable connection cable, a first connector plug-in connection part which is a first projection for connecting the electroblock with the sensor unit, and at least one screw passage opening for installation of the query unit on an outer surface of the toggle lever clamping apparatus, whereby the electroblock is installed on a housing wall of the toggle lever clamping apparatus from an outside;
    wherein the sensor unit comprises at least one sensor and a second connector plug-in connection part which has a second recess for connecting the sensor unit with the electroblock and attachable to the toggle lever clamping apparatus;
    said first projection plugging into said second recess; and
    wherein the opening is designed for shape-fit accommodation of the second connector plug-in connection part;
    wherein the second connector plug-in connection part is attachable in the opening with shape fit; and
    wherein the connector plug-in connection is integrated into the housing wall of a head in such a manner that the toggle lever clamping apparatus is sealed against outer influences and that the sensors are disposed in a protected manner; and
    wherein the electroblock has a connector comprising a shape-fit projection for shape-fit connection with the toggle lever clamping apparatus;

wherein the toggle lever clamping apparatus further comprises a shape-fit recess accommodation in the housing wall for the connector of the electroblock; and wherein the shape-fit projection is placed into the shape-fit recess accommodation for the connector.

* * * * *